United States Patent [19]
Rodermund et al.

[11] 3,880,031
[45] Apr. 29, 1975

[54] MACHINE FOR MANUFACTURING TINSEL

[75] Inventors: Gerd Rodermund, In der Breite 24, 763 Lahr; Helmut Kappus, Lahr, both of Germany

[73] Assignee: said Rodermund, by said Kappus

[22] Filed: Mar. 20, 1974

[21] Appl. No.: 452,796

[30] Foreign Application Priority Data
Nov. 7, 1973 Germany.................... 7339745

[52] U.S. Cl. ................... 83/81; 83/81; 83/83; 83/93; 83/147; 83/157; 83/167; 83/926 R
[51] Int. Cl. ................................ B26d 7/28
[58] Field of Search ............. 83/81, 83, 84, 93, 94, 83/147, 157, 165, 167, 926 R

[56] References Cited
UNITED STATES PATENTS
2,297,368  9/1942  Rippl et al. ................... 83/167 X
3,831,471  8/1974  Rahlander .................... 83/157 X Primary Examiner—J. M. Meister
Attorney, Agent, or Firm—Barnes, Kisselle, Raisch & Choate

[57] ABSTRACT

A machine for manufacturing tinsel comprising a cutting device for cutting sheet material into small strips and a feed device for the sheet. The cutting device comprises a rotary cutter having an effective length which is equal to the width of a strip fed continuously. The rotary cutter comprises a cutting edge arranged parallel to the axis of said rotary cutter. The feeding device comprises a pair of feed rollers arranged near the cutting edge. A chute is provided for collecting the cut-off tinsel threads. Counting means are provided for counting the number of revolutions of the rotary cutter and causing the chute to drop off the collected tinsel threads on said receiving means after a predetermined number of revolutions.

5 Claims, 3 Drawing Figures

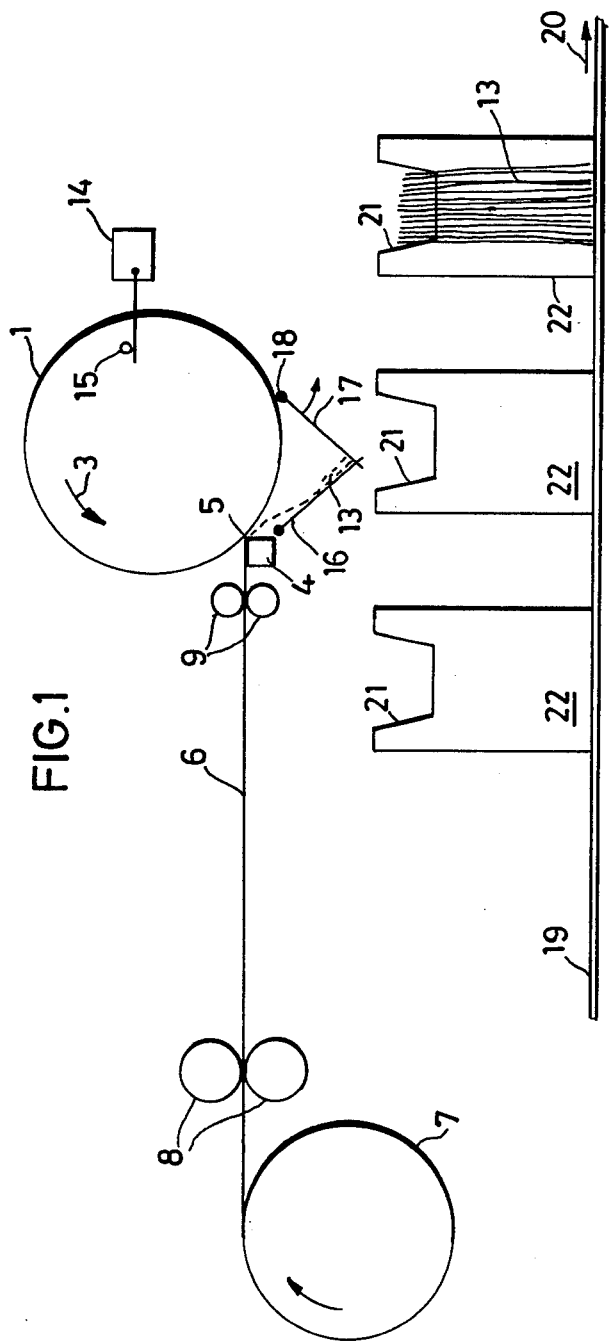

MACHINE FOR MANUFACTURING TINSEL

The invention relates to a machine for manufacturing tinsel (icicle) comprising a cutting device for cutting a metallic sheet in small strips, and with a feeding device for the metallic sheet.

Tinsel for decorating Christmas trees, branches and so on is usually manufactured from tin foil rolled out very thin or from metal coated plastic sheets. The sheets are cut into strips or threads having the desired length by rotating knives. Uniformly cutting the thin sheets into thin strips is made difficult by their fragility and more particularly by their lack of stiffness and, therefore, is hardly amenable to automation, so that the manufacturing process is relatively expensive.

The problem underlying the invention consists in providing a machine for manufacturing tinsel which is automated to a large extent and which cuts tinsel threads at great speed and precision. For solving the problem the invention starts from a machine of the type set forth in the beginning which is characterized in that the cutting device comprises in a manner per se known a rotary cutter whose effective length is equal to the width of a plastic strip fed continuously, and a cutting edge arranged parallel to the rotary cutter, that the feeding device comprises a pair of feeding rollers arranged near the cutting edge, that the cut tinsel threads are collected and that counting means are provided for counting the number of revolutions of the rotary cutter to cause the means for collecting the threads after a predetermined number of revolutions to drop the collected threads on a receiving means.

Contrary to known procedures which provide for the sheet to be cut in longitudinal direction, the cutting device used in the machine according to the invention will cause the threads to be severed in transversal direction. Thus, it will be possible to supply sheet strips of any length continuously. The length of the tinsel threads, which is equal to the width of the sheet strip, is determined by a rotary cutter and a cutting edge which is rather long compared with the length of rotary cutters heretofore known. Hence, provision must be made for a precise mounting and small limits of the diameter and the form of the rotary cutter, so that cutting is equal over the whole width of the sheet strip. Since the tinsel threads fall from the rotary cutter in parallel with it, they can without difficulty be collected in the arrangement in which they are to be packed. Owing to the rotary cutter having a predetermined number of cutting edges, the counting device for counting the number of revolutions of the rotary cutter allows a predetermined number of tinsel threads to be given out together for processing.

The material of the sheet strip may in particular be polyethylene or hardened polyvinyl chloride. This is a material which even when very thin has sufficient strength and inflammability. The sheets can also be easily colored or coated. For instance, aluminum may be deposited in vacuum to achieve a silvery sheen.

In order to obtain a uniform cut it is also necessary for the strip to be fed very accurately. On the one hand, the feed speed in connection with the number of revolutions of the rotary cutter determines the width of the tinsel threads, so that the feed speed must be kept constant in response to the number of revolutions of the rotary cutter. In addition, however, the feed must be equal over the whole width of the strip to omit curvatures and folds and, consequently, irregular cutting width. The invention, therefore, proposes to arrange a second pair of rollers prior to the feed rollers, and to connect the rollers on each side of the strip by a multitude of elastic rubber belts of the drive belt type arranged at regular distances. In this way, uniform and large-sectional guidance is obtained with a no-slip feed.

The collecting device comprises a chute one wall of which at least is pivotable around its upper edge so as to open the chute at the bottom. When a definite number of tinsel threads controlled by the counting device have been collected, they can be given off in packet-form through the open bottom of the chute.

It is another object of the invention to provide for the means to receive the tinsel threads to be made of cardboard having a cut-off portion and to be ready for sale, which the counter causes to be moved stepwise under the chute on a conveyor belt. At this moment a predetermined number of tinsel threads is placed automatically in the cut-off section of the cardboard, and the filled cardboards are thus ready for sale and need only be taken off the conveyor belt.

With these and other objects in view which will become apparent in the following detailed description, the present invention will be clearly understood in connection with the accompanying drawings, wherein:

FIG. 1 is a diagrammatic side elevation of a machine for manufacturing tinsel;

FIG. 2 is a partial view of a rotary cutter for use in a machine according to FIG. 1;

FIG. 3 is a special embodiment of the feed rollers for use in a machine according to FIG. 1.

Referring now to the drawings, the embodiment of the invention is shown only diagrammatically with its most important parts, since a more detailed representation of all features would hinder understanding of the invention. However, it will be understood that a stiff frame and exact mountings must be provided in the usual way to warrant the high degree of exactness necessary for the manufacture of tinsel.

The rotary cutter 1, which is shown in more detail in a side elevation in FIG. 2, is provided in a manner per se known with a multitude of cutting edges 2 arranged axially on its circumference and at equal distances. A drive (not shown), for instance an electric motor, rotates the rotary cutter 1 in the direction of arrow 3. Parallel to the rotary cutter 1 there is provided a rotary cutter 4 which almost touches rotary cutter 1. The length of rotary cutter 1 and of cutting edge 5 must be greater than the width of the strip 6 to be cut. The strip is fed from a supply source 7 by means of forwarding rollers 8 and forwarded to a pair of feed rollers arranged immediately in front of cutting edge 4. Feed rollers 9 may be driven (not shown) by the drive of rotary cutter 1, so that for instance the speed of the feed rollers may be changed by means of a belt drive. Since the width of the cut-off tinsel threads depends on the feed length between the passage of two subsequent edges 2 of rotary cutter 1 over cutting edge 5, changing the speed of the pair of feed rollers 9 with regard to the speed of rotary cutter 1 allows an adjustment of the width of the tinsel threads. The length of the tinsel threads may be for instance approximately 40 cm, while the width of the threads is only a few millimeters (usually 1 or 2 millimeters). Since deviations from this width over the length of the threads and also between different threads cannot be allowed for esthetic reasons, not only the rotary cutter 1 and the cutting edge 4 manufactured and adjusted with particular care, but there must also be made provision for a precise and uniform feed of strip 6. For this purpose, feed rollers 9 must have a substantially equal diameter over their whole length. Their rubber coating must not be too soft, so that when pressed together the feed speed over the whole width of strip 6 is not changed.

Maximum uniformity of speed can be obtained with the embodiment of the feeding device set forth in FIG. 3. There are provided two pairs of rollers 10 and 11 which are driven at the same speed. The pair of rollers 10 is arranged as near as possible to the cutting edge 4 (not shown in FIG. 3). The strip 6 is not supplied directly by the pair of rollers 10 and 11, but there are mounted on the two upper and the two lower rollers of pairs 10 and 11 endless rubber rings 12 which are fashioned like drive belts. A great number of such rubber rings 12 is uniformly distributed over the whole width of the strip, for instance at distances of a few centimeters; the rubber rings 12 are held on the rollers 10 and 11 by shoulders or edges on the rollers. In this way, a uniform guidance of strip 6 additionally balanced by the elasticity of the rubber rings is obtained over a distance of some length and irregularities are omitted.

With each rotation of rotary cutter 1, a number of tinsel threads is cut off which is equal to the number of the cutting edges 2 on the circumference of the rotary cutter 1. Counting means 14 operated by a cam 15 mounted on the front surface of rotary cutter 1 will count with the help of a multiplication factor the number of tinsel threads cut off. These will fall after cutting on cutting edge 5 into a chute consisting of two walls 16, 17. At the bottom of the angle formed by the two chute walls, the walls are interconnected in teeth-like fashion to prevent the tinsel threads from falling through. Chute wall 17 is pivotable around axis 18, so that counting means 14 can cause a predetermined number of collected tinsel threads 13 to be given off by opening the chute. Pivoting chute wall 17 may be effected for instance by a cam drive or pneumatic drive controlled by the counting means.

Below the cutting device there is running a conveyor belt 19 in the direction of arrow 20. On the conveyor belt are arranged cardboards 22 provided with cut-off sections 21, which are transported by means of the conveyor belt stepwise below chute 16, 17, so that they are under the center of the chute with regard to its longitudinal as well as transversal extension. When the chute is opened by pivoting chute wall 17, tinsel threads 13 will fall on cut-off section 21 and hand down on both sides of the cardboard, as shown in FIG. 1 on the right-hand side. Thus, the tinsel threads are ready for sale with exception of final packaging for instance in a transparent plastic material.

All essential and time consuming operations are automatic. An operator is only needed for mounting new supply rolls of strip material. In addition, cardboards 22 must be mounted on conveyor belt 20 and removed after filling. This operation is also amenable to automation without difficulties.

We claim:

1. A machine for manufacturing tinsel comprising a cutting device for cutting sheet material into small strips and a feed device for the sheet, characterized in that the cutting device comprises a rotary cutter having an effective length which is equal to the width of a strip fed continuously, said rotary cutter comprising a cutting edge arranged parallel to the axis of said rotary cutter, said feed device comprising a pair of feed rollers arranged near the cutting edge, a chute for collecting the cut-off tinsel threads, receiving means, and a counting means provided for counting the number of revolutions of the rotary cutter, and causing the chute to drop off the collected tinsel threads on said receiving means after a predetermined number of revolutions.

2. A machine according to claim 1 characterized in that a second pair of rollers is mounted in advance of the pair of feed rollers, said rollers being mounted on each side of the strip in the manner of drive belts and interconnected by a multitude of elastic rings.

3. A machine according to claim 2 characterized in that said receiving means comprises a chute having at least one of the chute walls pivotable around its upper edge to open the chute at the bottom.

4. A machine according to claim 1 characterized in that said receiving means comprises a chute having at least one of the chute walls pivotable around its upper edge to open the chute at the bottom.

5. A machine according to claim 1 characterized in that said receiving means for receiving the tinsel threads comprises upright boards having notched upper ends, means for moving said boards stepwise below said chute, provided with cut-off sections, said counting means causing said last-mentioned means to move said boards stepwise below said chute.

* * * * *